2,970,115

MANGANESE ACTIVATED CADMIUM AND ZINC CARBONATE PHOSPHORS AND THEIR PREPARATION

Paul Arthur, Jr., Wilmington, Del., assignor to E. I. du Pont de Nemours and Company, Wilmington, Del., a corporation of Delaware No Drawing. Filed July 5, 1957, Ser. No. 669,958

17 Claims. (Cl. 252—301.6)

This invention relates to new luminescent compositions and to their preparation. More particularly, this invention relates to novel cadmium and zinc carbonate phosphors and to a method for preparing them.

Certain zinc compounds, such as zinc sulfide, have been used as a luminescent pigment for many years. Zinc sulfide phosphors have been made by heating a mixture of zinc sulfide, an activating metal, e.g., copper, manganese or silver, and a fluxing salt, such as sodium chloride, at a temperature of 900–1200° C. These phosphors often show considerable afterglow. Recently, zinc and cadmium sulfide phosphors of uniform partice size, and which show little or no afterglow, have been made by heating cadmium and zinc sulfides with liquid hydrogen sulfide at a temperature and pressure above the critical temperature and pressure of hydrogen sulfide. These new zinc and cadmium sulfide phosphors are described and claimed in a copending application of John T. Maynard, U.S. Serial No. 464,632, filed October 25, 1954, now abandoned.

Other zinc compounds beside the sulfide have been used as phosphors. For example, manganese-activated zinc phosphate is a commercially useful phosphor in color television. However, it has not been entirely satisfactory because its red luminescence is not sufficiently intense, making it necessary to dilute the blue and green phosphors used with it in order to obtain the proper color balance. There is, accordingly, great need for the production of an intense red phosphor.

It is therefore an object of this invention to provide novel cathodoluminescent phosphors of high intensity and efficiency in the red shades. A further object is to provide novel intense red cadmium and zinc carbonate phosphors. A still further object is to provide a method for preparing cadmium and zinc carbonate phosphors. Other objects will appear hereinafter.

These and other objects of this invention are accomplished by preparing cadmium and zinc carbonate phosphors by heating, in the presence of carbon dioxide, cadmium carbonate or zinc carbonate, or zinc and cadmium compounds convertible to the normal carbonates by reaction with carbon dioxide at ordinary or elevated temperatures under ordinary or elevated pressures, at a temperature within the range of 100° to 800° C., preferably 300°–700° C., and in intimate admixture with a minor amount of a manganous compound. The carbon dioxide pressure in the reaction zone must be maintained equal to at least the equilibrium decomposition pressure of manganous carbonate under the temperature of operation. In the event zinc carbonate is present in the reaction system, the carbon dioxide pressure in the reaction zone must be as high as the equilibrium decomposition pressure of zinc carbonate at the operating temperature.

It has now been found that, in contrast to the zinc phosphors of the prior art, the phosphors obtained by heating the zinc and cadmium phosphor components, in accordance with the process of the present invention, show high intensity red emission.

This invention, accordingly, provides new group IIB metal carbonate phosphors which, under cathode ray excitation, show an intense red cathodoluminescence. These new phosphors are cadmium and zinc carbonates, that is, carbonates of group IIB metals having atomic numbers of from 30 to 48, promoted with from 0.1 to 5% by weight of a manganous compound, calculated as the carbonate.

As already indicated, in preparing the new zinc and cadmium carbonate phosphors, the carbon dioxide pressure in the reaction zone must be maintained at a value at least equal to the equilibrium decomposition pressure of manganous carbonate at the temperature selected for operation. This decomposition pressure for manganous carbonate ($MnCO_3$) can be readily calculated from the following equation:

$$\text{Log } P_{atm.} = \frac{-5984.3}{A} + 9.30000$$

where A is the reaction temperature in degrees absolute.

In the event zinc carbonate is present, the carbon dioxide pressure in the reaction zone must be as high as the zinc carbonate decomposition pressure at the operating temperature. The equilibrium composition pressure for zinc carbonate can be calculated by the use of the following equation:

$$\text{Log } P_{atm.} = \frac{-4881}{A} + 7.89079$$

where A is the reaction temperature in degrees absolute. Higher than minimum pressures are preferable since the higher pressures favor rapid and complete conversion to the carbonates.

The time of reaction is at least that which is required to effect crystallization of the carbonates. This is ascertained by X-ray diffraction analysis. Generally, under the preferred conditions of temperature and pressure, it is at least 0.1 hour and generally of the order of 3 hours or more.

In practice, a pressure reactor is charged with a mixture of a cadmium or zinc oxide, carbonate, or hydroxide and a manganous compound in amount equivalent to from 0.01 to 5% of manganous carbonate, based on the weight of the carbonate product. The charged reactor is then pressured with carbon dioxide so that at reaction temperature the pressure corresponds to at least the equilibrium decomposition pressure of manganous carbonate and as high as that of zinc carbonate, if present, at the temperature selected for operation. The reactor is then permitted to cool, excess carbon dioxide is vented, the reactor opened, and the contents discharged and stored.

The cadmium and zinc compounds usefully employable in this invention are those compounds which are convertible to normal carbonates by reaction with carbon dioxide at ordinary or elevated temperatures under ordinary or elevated pressures, or the preformed carbonates. Examples of compounds convertible to the normal carbonates are the oxides, hydroxides, hydrous oxides, basic carbonates and salts of acids which are weaker than carbonic, such as, zinc and cadmium orthoborates, zinc and cadmium sulfides, etc. In general, compounds which have been sintered or fused at high temperatures should be avoided to eliminate slow reaction rates.

Manganous compounds suitable as activators in the process of my invention are the oxide, oxide hydrate, carbonate, hydroxide, halides such as chlorides, bromides, iodides, fluorides, nitrate, sulfate, acetate, and the like. The preferred manganous compounds are manganous carbonate and manganous chloride and its hydrates. The manganous activator can be added to the zinc or cadmium compound in any manner which gives intimate admixture, for example, by grinding, by impregnation from solution or from a slurry, or by coprecipitation.

The examples which follow illustrate but do not limit this invention.

Example I

A pressure-resistant vessel is charged with an intimate admixture comprising 195 parts of zinc oxide, 6.3 parts of manganous carbonate, and 0.09 part of cerium nitrate hexahydrate. The vessel is then pressured with 650 atmospheres of carbon dioxide and heated to 300° C. The autogenously developed pressure of 1800 atmospheres is increased to 3000 atmospheres by injection of carbon dioxide and the charge is maintained at this temperature for 6 minutes whereupon the pressure is reduced to 1300 atmospheres by venting a portion of the gas. The vessel is then allowed to cool, the remaining gas pressure is vented and the charge recovered. The product is 218 parts of a slightly pinkish-gray, dry powder which shows the X-ray diffraction pattern of a mixture of zinc carbonate and zinc oxide. Under cathode ray excitation, the product shows a pale pink salmon-colored cathodoluminescence.

Example II

The same charge quantities as in Example I are placed in a pressure-resistant vessel and pressured with carbon dioxide to attain a gauge pressure of 700 atmospheres. The vessel is then heated to 300° C. and the autogenously developed pressure of 2400 atmospheres is augmented by injection of carbon dioxide to reach 2900 atmospheres. After 3 hours reaction at 300° C./2400–3100 atmospheres carbon dioxide pressure, the vessel is cooled to room temperature and the excess gas is vented.

The 221 parts of slightly pinkish-gray product obtained in this manner shows a faint pale red cathodoluminescence upon excitation by cathode rays. The untreated zinc oxide under the same excitation shows a pale light greenish-white cathodoluminescence. The X-ray diffraction pattern analysis shows the material is a mixture of zinc oxide and zinc carbonate.

Example III

Preparation of the manganese-activated zinc carbonate in molten salt is accomplished by charging a pressure-resistant vessel with an intimate admixture of 100 parts of basic zinc carbonate approximating $2ZnCO_3 \cdot 4Zn(OH)_2 \cdot H_2O$ in formula, 3 parts of manganous carbonate, and 400 parts of thallium carbonate. Carbon dioxide is injected to reach a pressure of 600 atmospheres. The vessel is then heated to 350° C. whereupon the autogenously developed pressure of 1460 atmospheres is augmented by injection of carbon dioxide to reach 3000 atmospheres. The vessel and contents are maintained at 350–357° C. and 3000–3090 atmospheres for 3 hours and then cooled. The product is recovered by venting the excess gas and removing the solid from the vessel. This shows a dull red cathodoluminescence, but no response to infrared nor ultraviolet radiation. To remove the thallium carbonate, 132 parts of product is slurried at room temperature in 3300 parts of water. The insoluble portion amounting to 38 parts is filtered off and dried. This material shows the X-ray diffraction pattern of zinc carbonate and exhibits a red cathodoluminescence upon excitation by cathode rays.

Example IV

An intimate mixture made by dry-grinding 112 parts of cadmium oxide and 1.5 parts of manganous carbonate is charged into a pressure-resistant vessel. The vessel is then pressured with 100 atmospheres carbon dioxide and heated to 700° C. During this heating the pressure rises autogenously to 2100 atmospheres whereupon it is released by venting to 1900 atmospheres. The temperature is maintained at 685–700° C. and the pressure at 1900–2200 atmospheres for 3 hours and the vessel is then allowed to cool. The 151 parts of product are recovered by venting the excess gas and removing the light tan powder. X-ray diffraction analysis indicates cadmium carbonate is the principal product containing a small proportion of cadmium oxide. The product shows a red orange cathodoluminescence upon exposure to cathode rays in a vacuum.

Less complete conversion to the carbonate is effected at a lower temperature and pressure, as is shown in the following example even though a cathodoluminescent product is still obtained.

Example V

The same charge quantities as in Example IV are pressured in a pressure-resistant vessel with 1500 lb./sq. in. carbon dioxide at —5° C. The vessel is then heated to 300° C. developing in this process an autogenous pressure of 1400 atmospheres. These conditions are maintained for 3 hours before the bomb is cooled and vented of excess pressure. The dark brown product, according to X-ray diffraction analysis, comprises principally the unconverted oxide with the carbonate being the minor component. The yield of product is 118 parts and it shows a dull orange cathodoluminescence.

It is possible to use other salts than the carbonate to furnish the manganous ion activator. In fact the more negative anion of the manganous chloride tetrahydrate exerts a slight adjuvant effect on the conversion to carbonate as shown in the following example.

Example VI

An intimate mixture of 112 parts of cadmium oxide and 2.6 parts of manganous chloride tetrahydrate is made by uniformly moistening the oxide with a sufficient quantity of approximately 1% solution of the chloride and then drying the composition. This is then placed in a pressure-resistant vessel and pressured with 150 atmospheres of carbon dioxide. Upon heating the assembly to 700° C. an autogenous pressure of over 2000 atmospheres pressure is developed. By venting and heating the reaction is maintained at 690–700° C. for 3 hours under 2000–2200 atmospheres of carbon dioxide pressure. After cooling and venting the vessel, the 140 parts of pale light tan product is recovered. This exhibits a bright yellowish orange-red cathodoluminescence under cathode rays. The X-ray diffraction analysis gives the pattern of cadmium carbonate with only a trace of cadmium oxide.

The response to cathode rays in the manganese-activated cadmium carbonate is dependent on the concentration of manganous ion as is indicated by the following example.

Example VII

The procedures of the preceding examples are used to prepare manganese-activated cadmium carbonate samples at 700° C. using 3 hours reaction time under 2000 atmospheres carbon dioxide pressure. To insure uniformity of sample the compositions containing 5 and 12% manganous carbonate produced in this manner are ground, mixed and rerun under the same conditions of treatment. The following responses are obtained in tests under vacuum with cathode ray excitation.

| Percent Manganous Carbonate: | Cathodoluminescence |
|---|---|
| 0.1 | Faint orange red. |
| 0.5 | Strong orange red. |
| 1.0 | Do. |
| 2.0 | Medium orange red. |
| 5.0 | Faint orange red. |
| 12.5 | Inactive. |
| 50.0 | Do. |

In addition, the samples containing from 0.5 to 5.0% manganous carbonate show a faint red response to irradiation with 2537A. ultraviolet light. This characteristic is useful in checking the location of the phosphor at atmospheric pressure without need for evacuation.

Instrumental evaluation of the 0.5% manganous carbonate composition at 5 kilovolt cathode ray excitation shows that the ICI (International Commission on Illumination) color coordinates are: $x=0.620$, $y=0.374$ and the intensity relative to a commercial manganese-activated zinc phosphate phosphor is 139%. The decay time in milliseconds to 25% of original brightness is 73 milliseconds and to 10% is 83 milliseconds.

*Example VIII*

A pressure-resistant vessel is charged with 126.1 parts of cadmium hydroxide intimately mixed with 2.58 parts of manganous chloride tetrahydrate. Carbon dioxide is then injected to a pressure of 325 atmospheres and the assembly is heated to 369° C. developing an autogenous pressure of 1300 atmospheres. At this point, carbon dioxide is injected to provide a pressure of 2025 atmospheres. Heating is continued to 475° C. and the reaction is maintained at 471–482° C. and 2860–3000 atmospheres carbon dioxide pressure for a period of 3 hours. The assembly is cooled and the excess gas is vented. The product so obtained is an essentially white powder which shows a strong orange red cathodoluminescence.

As in the case of the cadmium carbonate compositions the zinc carbonate compositions are also responsive to cathode rays in relation to the content of manganous compound activator added to the composition.

*Example IX*

A series of compositions of basic zinc carbonate containing manganous carbonate are treated at 350° C. for 3 hours under 3000 atmospheres carbon dioxide pressure as described in Example III. The response to cathode ray excitation is as follows:

| Percent Manganous Carbonate: | Cathodoluminescent Response |
|---|---|
| 0.1 | Very faint red. |
| 0.5 | Do. |
| 1.0 | Moderate red. |
| 2.0 | Very faint red. |

Further examination of the 1.0% composition shows that it has a brightness relative to a commercial manganese-activated zinc phosphate of 9.5% as determined on a General Electric Company Spectroradiometer. The ICI (International Commission on Illumination) color coordinates are: $x=0.691$ and $y=0.309$ under 5 kilovolt excitation. The delay time to 25% of the original brightness is 1.3 milliseconds and to 10% is 30 milliseconds.

It is also possible to prepare the cathodoluminescent phosphors of this invention simultaneously in the same reaction as shown in the following example.

*Example X*

An intimate mixture of the hydroxides of cadmium and zinc is prepared by precipitating the hydroxides from an aqueous solution of the nitrates made from 770 parts of cadmium oxide and 1953 parts of zinc oxide so that the molar ratio is 1:4. Aqueous sodium hydroxide solution is the precipitant. The composition is isolated by filtration, washed with water, and dried at 65° C. under a vacuum of 20 inches of mercury in a slow stream of air.

An intimate mixture of 1088 parts of the hydroxide composition is made by grinding with 16.15 parts of manganous carbonate. This is charged into a pressure-resistant vessel and carbon dioxide injected to provide a pressure of 600 atmospheres. The assembly is then heated to 350° C. with injections of carbon dioxide being made to insure maintenance of 1350 atmospheres pressure at 200° C., 1900 atmospheres at 300° C., and 2800 atmospheres at 350° C. The reaction is maintained at 348–353° C. at 3 hours under 2800–3000 atmospheres carbon dioxide pressure. The assembly is then cooled and the excess gas vented. The isolated product amounting to 1362 parts shows a faint red cathodoluminescence under cathode ray excitation. X-ray diffraction analysis of the product shows that it is a composite of zinc carbonate, cadmium carbonate and zinc oxide.

The manganous compound activated cadmium or zinc carbonate compositions produced in accord with this invention are useful in all applications where emission characteristics similar to those in a cathode ray tube are desired. They are cathodoluminescent phosphors of high intensity and efficiency in the red region of the spectrum, and are particularly useful as phosphors in color television screens.

The manganous compound activated cadmium and zinc carbonates of this invention can be blended with other phosphors to produce mixed colors. They can also contain other activator adjuvant components such as thallium, lead and cerium salts.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for preparing a metal carbonate phosphor, which comprises heating at a temperature within the range of 100° to 800° C. and, in the presence of carbon dioxide, a compound selected from the group consisting of carbonates of cadmium and zinc oxides of said metals, hydroxides of said metals, hydrous oxides of said metals, basic carbonates of said metals, and salts of said metals with acids weaker than carbonic, in intimate admixture with an activating manganous compound in an amount equivalent to from 0.01 to 5% by weight calculated as manganous carbonate of the carbonate phosphor, the carbon dioxide pressure in the reaction zone being maintained at a value at least equal to the equilibrium decomposition pressure of manganous carbonate at the temperature of operation and as high as the equilibrium decomposition pressure for zinc carbonate at said temperature of operation when zinc carbonate is also present.

2. Process for preparing a zinc carbonate phosphor which comprises heating at a temperature within the range of 100° to 800° C., under a carbon dioxide pressure at least equal to the equilibrium decomposition pressure of manganous carbonate and as high as the equilibrium decomposition pressure of zinc carbonate, a zinc compound selected from the group consisting of zinc carbonate, zinc oxide, zinc hydroxide, hydrous zinc oxide, basic zinc carbonate and zinc salts with acids weaker than carbonic, in contact with a manganous activator, said activator being present in an amount equivalent when calculated as manganous carbonate to from 0.01 to 5% by weight of the carbonate phosphor.

3. Process for preparing a cadmium carbonate phosphor which comprises heating at a temperature within the range of 100° to 800° C., under a carbon dioxide pressure at least equal to the equilibrium decomposition pressure of manganous carbonate, a cadmium compound selected from the group consisting of cadmium carbonate, cadmium oxide, cadmium hydroxide, hydrous cadmium oxide, basic cadmium carbonate and cadmium salts with acids weaker than carbonic in contact with a manganous activator, said activator being present in an amount equivalent when calculated as manganous carbonate to form 0.01 to 5% by weight of the carbonate phosphor.

4. Process for preparing a metal carbonate phosphor, which comprises heating at a temperature within the range of 300° to 700° C. and, in the presence of carbon dioxide, a compound selected from the group consisting of carbonates of cadmium and zinc oxides of said metals, hydroxides of said metals, hydrous oxides of said metals, basic carbonates of said metals, and salts of said metals with acids weaker than carbonic, in intimate admixture with an activating manganous compound in an amount equivalent to from 0.01 to 5% by weight calculated as manganous carbonate of the carbonate phosphor, the carbon dioxide pressure in the reaction zone being maintained at a value at least equal to the equilibrium decomposition pressure of manganous carbonate at the temperature of operation and as high as the equilibrium decomposition pressure for zinc carbonate at said temperature of operation when zinc carbonate is also present.

5. Process for preparing a manganous compound activated zinc carbonate phosphor which comprises heating at a temperature within the range of 300° to 700° C. and in the presence of carbon dioxide, zinc carbonate in intimate admixture with from 0.01 to 5% by weight of a manganous activator calculated as the carbonate and based on weight of zinc carbonate, the carbon dioxide pressure being maintained at least equal to the equilibrium decomposition pressure for manganese carbonate at the temperature of operation, and as high as the equilibrium decomposition pressure for zinc carbonate at said temperature of operation.

6. Process for preparing a manganous compound activated zinc carbonate phosphor which comprises heating at a temperature within the range of 300° to 700° C. and in the presence of carbon dioxide, zinc oxide in intimate admixture with from 0.01 to 5% by weight of a manganous activator calculated as the carbonate and based on weight of zinc carbonate, the carbon dioxide pressure being maintained at least equal to the equilibrium decomposition pressure for manganous carbonate at the temperature of operation, and as high as the equilibrium decomposition pressure for zinc carbonate at said temperature of operation.

7. Process for preparing a manganese-activated zinc carbonate phosphor which comprises heating at a temperature within the range of 300° to 700° C. and in the presence of carbon dioxide, zinc hydroxide in intimate admixture with from 0.01 to 5% by weight of a manganous activator calculated as the carbonate and based on weight of zinc carbonate, the carbon dioxide pressure being maintained at least equal to the equilibrium decomposition pressure for manganous carbonate at the temperature of operation, and as high as the equilibrium decomposition pressure for zinc carbonate at said temperature of operation.

8. Process for preparing a manganous compound activated cadmium carbonate phosphor which comprises heating at a temperature within the range of 300° to 700° C. and in the presence of carbon dioxide, cadmium carbonate in intimate admixture with from 0.01 to 5% by weight of a manganous activator calculated as the carbonate and based on weight of cadmium carbonate, the carbon dioxide pressure being maintained at least equal to the equilibrium decomposition pressure for manganous carbonate at the temperature of operation.

9. Process for preparing a manganous compound activated cadmium carbonate phosphor which comprises heating at a temperature within the range of 300° to 700° C. and in the presence of carbon dioxide, cadmium oxide in intimate admixture with from 0.01 to 5% by weight of a manganous activator calculated as the carbonate and based on weight of cadmium carbonate, the carbon dioxide pressure being maintained at least equal to the equilibrium decomposition pressure for manganous carbonate at the temperature of operation.

10. Process for preparing a manganous compound activated cadmium carbonate phosphor which comprises heating at a temperature within the range of 300° to 700° C. and in the presence of carbon dioxide, cadmium hydroxide in intimate admixture with from 0.01 to 5% by weight of a manganous activator calculated as the carbonate and based on weight of cadmium carbonate, the carbon dioxide pressure being maintained at least equal to the equilibrium decomposition pressure for manganous carbonate at the temperature of operation.

11. A phosphor selected from the class consisting of zinc carbonate and cadmium carbonate which is the product obtained by heating at a temperature within the range of 100° to 800° C. and, in the presence of carbon dioxide, a compound selected from the group consisting of carbonates of cadmium and zinc oxides of said metals, hydroxides of said metals, hydrous oxides of said metals, basic carbonates of said metals, and salts of said metals with acids weaker than carbonic, in intimate admixture with an activating manganous compound in an amount equivalent to from 0.01 to 5% by weight calculated as manganous carbonate of the carbon phosphor, the carbon dioxide pressure in the reaction zone being maintained at a value at least equal to the equilibrium decomposition pressure of manganous carbonate at the temperature of operation and as high as the equilibrium decomposition pressure for zinc carbonate at said temperature of operation when zinc carbonate is also present.

12. A zinc carbonate phosphor promoted with from 0.01 to 5% by weight of a manganous activator calculated as the carbonate which is the product obtained by heating at a temperature within the range of 100° to 800° C., under a carbon dioxide pressure at least equal to the equilibrium decomposition pressure of manganous carbonate and as high as the equilibrium decomposition pressure of zinc carbonate, a zinc compound selected from the group consisting of zinc carbonate, zinc oxide, zinc hydroxide, hydrous zinc oxide, basic zinc carbonate and zinc salts with acids weaker than carbonic, in contact with a manganous activator, said activator being present during said heating in an amount equivalent when calculated as manganous carbonate to from 0.01 to 5% by weight of the carbonate phosphor.

13. A cadmium carbonate phosphor promoted with from 0.01 to 5% by weight of a manganous activator calculated as the carbonate which is the product obtained by heating at a temperature within the range of 100° to 800° C., under a carbon dioxide pressure at least equal to the equilibrium decomposition pressure of manganous carbonate, a cadmium compound selected from the group consisting of cadmium carbonate, cadmium oxide, cadmium hydroxide, hydrous cadmium oxide, basic cadmium carbonate and cadmium salts with acids weaker than carbonic, in contact with a manganous activator, said activator being present during said heating in an amount equivalent when calculated as manganous carbonate to from 0.01 to 5% by weight of the carbonate phosphor.

14. A zinc carbonate phosphor as set forth in claim 12 wherein said manganous activator is manganese carbonate and said zinc compound is zinc carbonate.

15. A zinc carbonate phosphor as set forth in claim 12 wherein said manganous activator is manganese carbonate and said zinc compound is zinc oxide.

16. A cadmium carbonate phosphor as set forth in claim 13 wherein said manganous activator is manganese carbonate and said cadmium compound is cadmium oxide.

17. A cadmium carbonate phosphor as set forth in claim 13 wherein said manganous activator is manganese chloride tetrahydrate and said cadmium compound is cadmium oxide.

References Cited in the file of this patent

UNITED STATES PATENTS 2,285,464    Ruthruff _____ June 9, 1942

OTHER REFERENCES

"Fluorochemistry," by Dement Chem. Pub. Co., N.Y. (1945), pages 433–438.

Sommer: Indus. Appli. of Lumin., Electronic Engr. (December 1946), page 361.

"Some Aspects of The Luminescence of Solids," by Kroger, Elsevier Publ. Co., N.Y. (1948), pages 57–61.

"Fluorescence & Phosphorescence," by Pringsheim Interscience Pub. Inc., N.Y. (1949), pages 518–519.

"Luminescence of Solids," by Leverenz Wiley & Sons Inc., N.Y. (1950), pages 240–242.